(12) United States Patent
Jacobs et al.

(10) Patent No.: US 7,594,028 B1
(45) Date of Patent: Sep. 22, 2009

(54) COUNTING OF GVRP PROTOCOL DATA UNITS WITHIN A NETWORK BRIDGE

(75) Inventors: Wynona Persephone Jacobs, Cary, NC (US); Steven Edward Ledford, Holly Springs, NC (US); Alejandro Emilio Vasquez, Raleigh, NC (US); Colin Michael Winegarden, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 09/561,361

(22) Filed: Apr. 28, 2000

(51) Int. Cl.
G06F 15/173 (2006.01)

(52) U.S. Cl. .................. 709/242; 709/202; 709/238; 709/250; 370/401; 370/402; 370/408

(58) Field of Classification Search ......... 709/200–203, 709/238–242, 245, 249–250; 370/229–230, 370/256, 400–409
See application file for complete search history.

(56) References Cited

U.S. PATENT DOCUMENTS

| | | | | |
|---|---|---|---|---|
| 5,559,955 | A | | 9/1996 | Dev et al. ............... 395/182.02 |
| 5,572,533 | A | | 11/1996 | Sunada et al. ............. 371/20.1 |
| 5,664,105 | A | | 9/1997 | Keisling et al. ......... 395/200.54 |
| 5,699,348 | A | | 12/1997 | Baidon et al. .............. 370/242 |
| 5,748,905 | A | | 5/1998 | Hauser et al. .......... 395/200.79 |
| 5,818,842 | A | | 10/1998 | Burwell et al. ............. 370/397 |
| 5,835,710 | A | | 11/1998 | Nagami et al. .......... 395/200.8 |
| 5,850,388 | A | | 12/1998 | Anderson et al. ........... 370/252 |
| 5,878,232 | A | | 3/1999 | Marimuthu ............ 395/200.79 |
| 5,926,463 | A | | 7/1999 | Ahearn et al. ............... 370/254 |
| 5,946,308 | A | | 8/1999 | Dobbins et al. ............. 370/392 |
| 5,991,299 | A | | 11/1999 | Radogna et al. ............. 370/392 |
| 6,058,102 | A | * | 5/2000 | Drysdale et al. ............ 370/252 |
| 6,115,776 | A | * | 9/2000 | Reid et al. .................. 709/250 |
| 6,446,131 | B1 | * | 9/2002 | Khansari et al. ............ 709/238 |
| 6,515,969 | B1 | * | 2/2003 | Smith ......................... 370/401 |
| 6,535,490 | B1 | * | 3/2003 | Jain ............................ 709/239 |
| 6,707,818 | B1 | * | 3/2004 | Kadambi et al. ............ 370/391 |
| 6,785,272 | B1 | * | 8/2004 | Sugihara ..................... 370/400 |
| 6,847,620 | B1 | * | 1/2005 | Meier ......................... 370/401 |
| 6,996,099 | B1 | * | 2/2006 | Kadambi et al. ............ 370/389 |
| 7,366,171 | B2 | * | 4/2008 | Kadambi et al. ............ 709/238 |
| 7,428,237 | B1 | * | 9/2008 | Gai et al. .................... 709/241 |

OTHER PUBLICATIONS

"IBM 8275 High-Performance Ethernet Workgroup Switch Model 416," International Business Machines Corporation 1999, 4 pp.
"Ethernet," Toronto Microelectronics Inc., available via the Internet at http://www.tme-inc.com/html/service/general/ether.htm, pp. 1-8.
"Draft Standard P802.1Q/D10 IEEE Standards for Local and Metropolitan Area Networks: Virtual Bridged Local Area Networks," IEEE, Mar. 22, 1998, pp. 1-212.
"Information Technology—Telecommunications and Information Exchange Between Systems—Local and Metropolitan Area Networks—Common Spcifications—Part 3: Media Access Control (MAC) Bridges," IEEE, Mar. 19, 1998, pp. 1-377.

* cited by examiner

*Primary Examiner*—Bharat N Barot
(74) *Attorney, Agent, or Firm*—Winstead P.C.; Mark McBurney

(57) ABSTRACT

Counters are implemented within an 802.1Q VLAN (Virtual Local Area Network) bridge model to assist a network administrator in diagnosing network problems associated with the dynamic registration of VLANs. Such counters are able to count the number of dynamic VLANs propagated through a bridging device, and for monitoring the maximum number of VLANs ever simultaneously configured on a bridge device.

14 Claims, 4 Drawing Sheets

COUNTING OF GVRP PROTOCOL DATA UNITS WITHIN A NETWORK BRIDGE

TECHNICAL FIELD

The present invention relates in general to data processing networks, and in particular to a bridge utilized to couple a plurality of local area networks.

BACKGROUND INFORMATION

There are many different types of networks and network systems for sharing files and resources or for otherwise enabling communication between two or more computers. The term "network device" generally refers to a computer linked to a network via a network interface card (NIC), or to other devices that perform specialized functions in the network, such as repeaters or hubs, bridges, switches, routers and brouters, to name a few examples. Networks may be categorized based on various features and functions, such as message capacity, range over which nodes are distributed, node or computer types, node relationships, topology or logical and/or physical layout, architecture or structure based on cable type and data packet format, access possibilities, etc. For example, the range of a network refers to the distance over which nodes are distributed, such as local-area networks (LAN) within an office or floor of a building, wide-area networks (WANs) spanning across a college campus, or a city or a state and global-area networks (GANs) spanning across national boundaries.

A network may be expanded by using one or more repeaters, bridges, switches or similar type devices. A repeater is a device that moves all packets from one network segment to another by regenerating, re-timing, and amplifying the electrical signals. A bridge is a device that operates at the Data-Link Layer of the OSI (Open Systems Interconnection) Reference Model and passes packets from one network to another and increases efficiency by filtering packets to reduce the amount of unnecessary packet propagation on each network segment. A switch is a network device similar in function to a multiple port bridge, but includes a plurality of ports for coupling to several similar networks for directing network traffic among the networks.

Some bridging devices, such as multiple port bridges, switches, routers or the like include the capability for a user to define one or more Virtual LANs (VLANs). Separate VLANs enable separate address space to be associated with each VLAN. The user or network administrator defines one or more VLANs by grouping one or more ports together in a VLAN definition, where the bridging device effectively separates each VLAN from the other ports. Bridging devices which are VLAN-capable forward traffic amongst ports which are members of the same VLAN.

Within a bridge, it is often desired to monitor the performance of the bridge or diagnose network problems using various statistics. Present statistics monitoring techniques described in the IEEE 802.1D and IEEE 802.1Q specifications are inadequate for performance monitoring or assisting in diagnosing network problems or security issues.

SUMMARY OF THE INVENTION

The present invention addresses the foregoing needs by providing counters that can be used by a network administrator in diagnosing network problems associated with the dynamic registration of VLANs via GVRP (Generic Attribute Registration Protocol (GARP) VLAN Registration Protocol). These additional counters are useful in two ways.

A first way in which these counters are useful is in determining whether devices are propagating GVRP PDUs (Protocol Data Units). A Rcv (received) GVRP PDUs counter represents the number of GVRP PDUs received and processed by a particular port. This counter is useful in diagnosing problems in which GVRP registration was expected on a port, but is not occurring. A Xmit (transmit) GVRP PDUs counter represents the number of GVRP PDUs transmitted by a particular port. This counter is useful for determining if a device is failing to propagate GVRP PDUs from a particular port.

A second way in which these counters are useful is in giving a network administrator both historical and current information regarding the number and type of IEEE 802.1Q VLANs configured on a device. An attempt to give such information is made in the VLAN MIB (proposed standard RFC 2674). Among others, the VLAN MIB defines two counters. A dot1qMaxSupportedVlans counter tracks a maximum number of IEEE 802.1Q VLANs that this device supports. A dot1qNumVlans counter tracks current 802.1Q VLANs that this device supports.

However, the counters defined in the VLAN MIB are insufficient to give a network administrator knowledge of either the greatest number of VLANs ever simultaneously configured on the device, or the nature of the VLANs configured on the device. For this reason, the present invention implements two counters. A Most VLANs counter counts the greatest number of VLANs ever simultaneously configured on a device, including both static and dynamic VLAN entries. The counter is useful from a historical perspective. For example, suppose a network administrator expects to have only 8 VLANs ever present in a network. If a device has recorded that 9 or more VLANs have ever been concurrently configured in its tables, the network administrator is alerted to a potential security breach. This information is of particular importance when dynamic VLAN registration is allowed. A Dynamic VLAN Entries counter counts the current number of dynamic VLANs registered with the device. This counter can be used in conjunction with the dot1qNumVlans counter to determine the number of static VLANs present on a device. The calculation is as follows:

Number of Static VLANs=dot1qNumVlans−Dynamic VLAN Entries.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
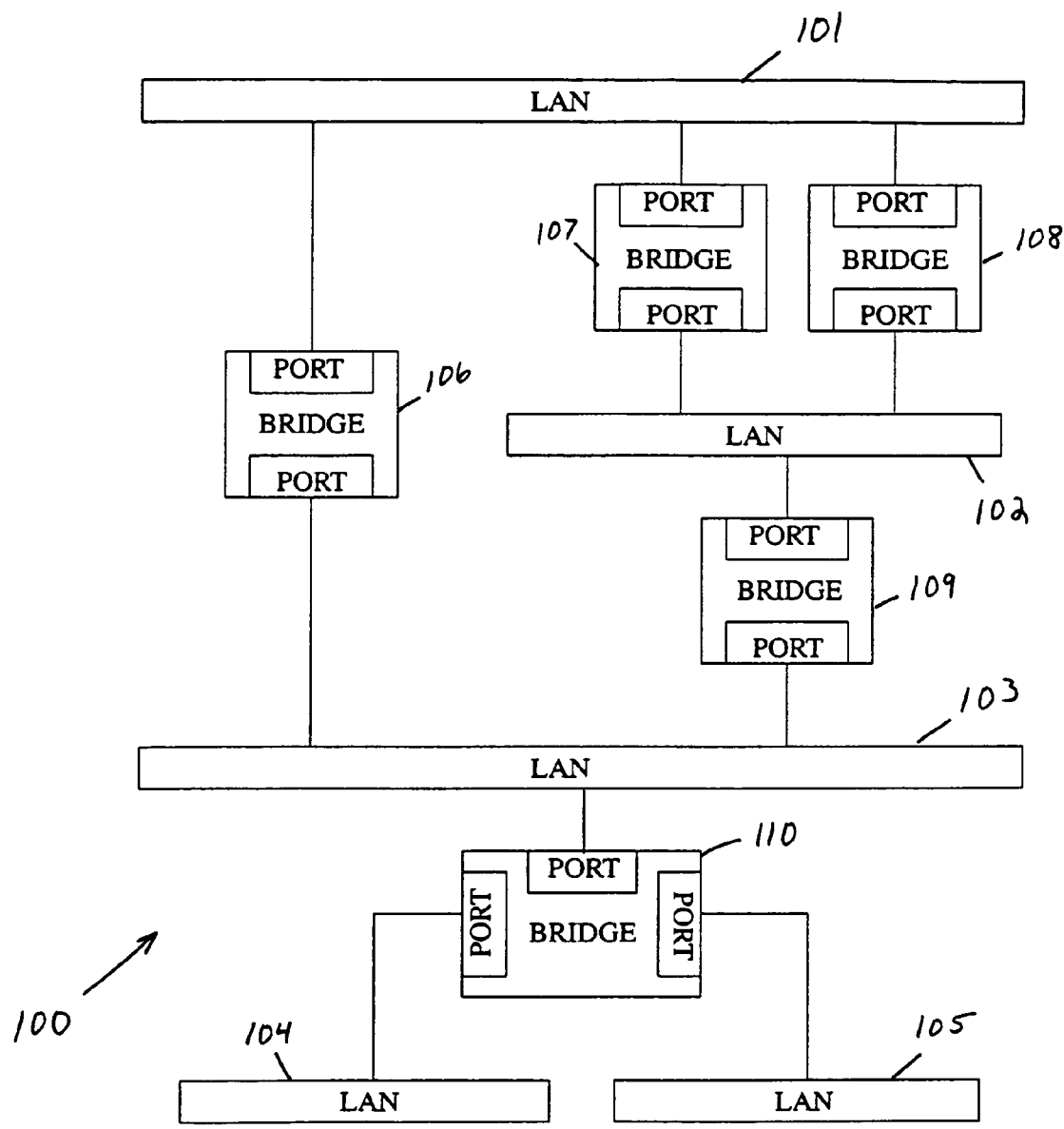
FIG. 1 illustrates a bridged local area network.

In the following description, numerous specific details are set forth such as specific network topologies, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Standards-based statistics defined for traditional IEEE 802.1D bridges are inadequate to diagnose problems related to the management of IEEE 802.1Q based bridges. The present invention defines statistics which give network managers accurate information regarding the management of 802.1Q compliant bridges and their networks.

Referring to FIG. 1, there is illustrated an example of the physical topology of a bridged local area network (LAN) 100. The component LANs 101-105 are interconnected by means of MAC (Media Access Control) bridges 106-110; each port of a MAC bridge connects to a single LAN. For example, one port within bridge 106 connects to LAN 101, while the other port within bridge 106 connects to LAN 103. IEEE LANs of all types can be connected together by using MAC bridges. Each individual LAN has its own independent MAC. The bridged local area network 100 created allows the interconnection of stations attached to separate LANs as if they were attached to a single LAN, although they are in fact attached to separate LANs, each with its own MAC. A MAC bridge operates below the MAC service boundary, and is transparent to protocols operating above this boundary, in the Logical Link Control (LLC) sublayer or Network Layer. For further discussion of MAC bridges, refer to IEEE 802.1D, Information technology—Telecommunications and information exchange between systems—Local and metropolitan area networks—Common specifications—Part 3: Media Access Control (MAC) Bridges, Institute of Electrical and Electronics Engineers, Inc., IEEE P802.1D/D16, Mar. 19, 1998, which is hereby incorporated by reference herein. For further discussion of bridged LANs, refer to IEEE 802.1Q, Draft Standard P802.1Q/D10 IEEE Standards for local and Metropolitan Area Networks: Virtual Bridged Local Area Networks, Institute of Electrical and Electronics Engineers, Inc., P802.1Q/D10, Mar. 22, 1998, which is hereby incorporated by reference herein. Essentially, a virtual bridged LAN permits devices within various ones of the LANs to be combined into their own virtual LAN through the bridges.

The egress rules (see, IEEE 802.1Q, Clause 8.8) defined for the forwarding process in VLAN bridges rely on the existence of configuration information for each VLAN that defines the set of ports of the bridge through which one or ore members are reachable. This set of ports is known as the Member Set (see IEEE 802.1Q, Clause 8.11.9), and its membership is determined by the presence or absence of configuration information in the Filtering Database 205 of the bridge (see FIG. 2), in the form of Static and Dynamic VLAN Registration Entries (see IEEE 802.1Q, Clauses 8.11.2, 8.11.5).

Reliable operation of the VLAN infrastructure requires VLAN membership information held in the Filtering Database 205 to be maintained in a consistent manner across all VLAN-aware bridges in the bridged LAN 100, in order to ensure that frames destined for end station(s) on a given VLAN can be correctly delivered, regardless of where in the bridged LAN 100 the frame is generated. Maintenance of this information by end stations that are sources of VLAN-tagged frames can allow such stations to suppress transmission of such frames if no members exist for the VLAN concerned.

Figure 2:
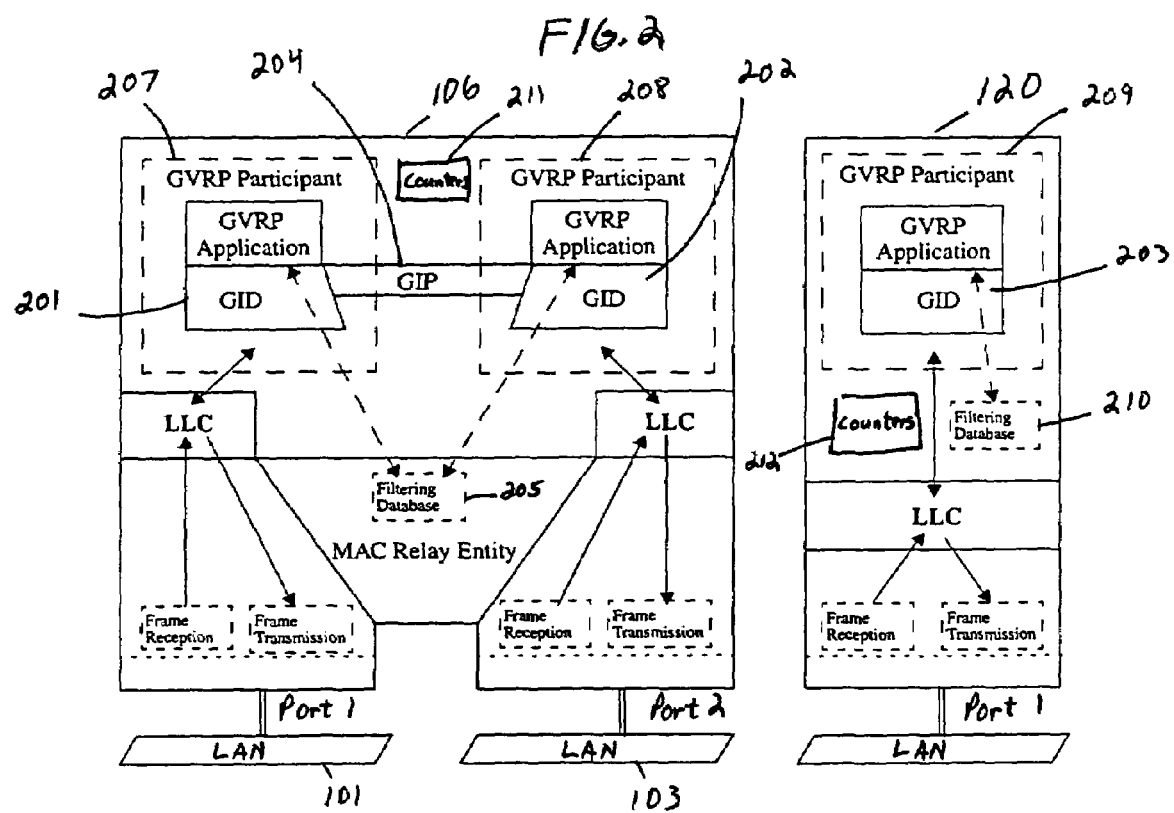
FIG. 2 illustrates operation of GVRP in accordance with the present invention.

Referring to FIG. 2, the GARP VLAN Registration Protocol (GVRP) defines a GARP Application that provides the VLAN registration service defined in IEEE 802.1Q, Clause 11.2.2. GVRP makes use of GARP Information Declaration (GID) 201-203 and GARP Information Propagation (GIP) 204, which provide the common state machine descriptions and the common information propagation mechanisms defined for use in GARP-based applications. The GARP architecture, GID 201-203 and GIP 204 are defined in IEEE 802.1Q.

GVRP provides a mechanism for dynamic maintenance of the contents of dynamic VLAN registration entries for each VLAN, and for propagating the information they contain to other bridges. This information allows GVRP-aware devices to dynamically establish and update their knowledge of the set of VLANs that currently have active members, and through which ports those members can be reached.

GVRP allows both end stations and bridges in a Bridged LAN 100 to issue and revoke declarations relating to membership of VLANs. The effect of issuing such a declaration is that each GVRP Participant 207-209 that receives the declaration will create or update a Dynamic VLAN Registration Entry in the Filtering Database 205 to indicate that VLAN is registered on the reception port. Subsequently, if all Participants 207-209 on a segment that had an interest in a given VID (virtual LAN identifier) revoke their declarations, the port attached to that segment is set to Unregistered in the Dynamic VLAN Registration Entry for that VLAN by each GVRP Participant attached to that segment.

FIG. 2 illustrates the architecture of GVRP in the case of a two-port bridge 106 and an end station 120.

VLAN-aware end stations, such as end station 120, participate in GVRP protocol activity, as appropriate for the set of VLANs of which they are currently members, GVRP provides a way for such an end station 120 to ensure that the VLAN(s) of which it is a member are registered for each port on any LAN segment to which the end station 120 is attached. GVRP also provides for that VID information to be propagated across the spanning tree to other VLAN-aware devices, as described in IEEE 802.1Q, Clause 11.2.1.2.

Incoming VLAN membership information (from all other devices on the same LAN segment) allows such end stations to "source prune" (i.e. discard at source—see IEEE 802.1D, Clause 10.2.2) any traffic destined for VLANs that currently have no other members in the bridged LAN 100, thus avoiding the generation of unnecessary traffic on their local LAN segments. This is illustrated in FIG. 2 by Filtering Database 210 in end station 120.

The group MAC address used as the destination address for GARP PDUs destined for GVRP Participants 207-209 shall be the GVRP address identified in Table 1. Received PDUs that are constructed in accordance with the PDU format defined in IEEE 802.1D, Clause 12.11, and which carry a destination MAC address equal to the GVRP address are processed as follows:

a) In bridges 106 and end stations 120 that support the operation of GVRP, all such PDUs shall be submitted to the GVRP Participant 207-209 associated with the receiving port for further processing;

b) In bridges that do not support the operation of GVRP, all such PDUs shall be submitted to the Forwarding Process.

TABLE 1

GVRP Application address

| Assignment | Value |
| --- | --- |
| GVRP address | 01-80-C2-00-00-21 |

The present invention is implemented using counters 211-212 within bridge 106 or end station 120, respectively, wherein such counters 211-212 can be implemented in either software or hardware. An example of a software counter would be a piece of code that would increment a count by monitoring the reason for deallocating buffers in bridge 106 or end station 120 through which frame packets were temporarily stored. For example, if a frame was forwarded from one process to another, in other words, control of the buffer containing the frame is passed from one process to another, the software code would make note of such a forwarding and increment any counters associated with the activity. Likewise, if a frame was not forwarded for some reason, in other words the frame was filtered or discarded, then a software counter would make note of such incident and also increment if so programmed.

The counters 211-212 of the present invention perform the functions described in Table 2.

TABLE 2

| Management Counter | Definition |
| --- | --- |
| Rcv GVRP PDUs | Number of GVRP PDUs received and processed on this port by the GVRP protocol. |
| Xmit GVRP PDUs | Number of GVRP PDUs transmitted on this port from the GVRP protocol. |
| Most VLANs | The greatest number of VLANs ever simultaneously configured on the device, including dynamic VLAN entries. |
| Dynamic VLAN Entries | Current number of dynamic VLANs registered with the device. (The combination of this counter and the dot1qNumVlans counter (number of current VLANs) can be used to calculate the number of static VLANs. This counter is analogous to the statistic dot1qFdbDynamicCount in the proposed VLAN MIB, RFC 2674. The dot1qFdbDynamic Count statistic gives the current number of dynamic entries in a particular Filtering Database.) |

Figure 3:
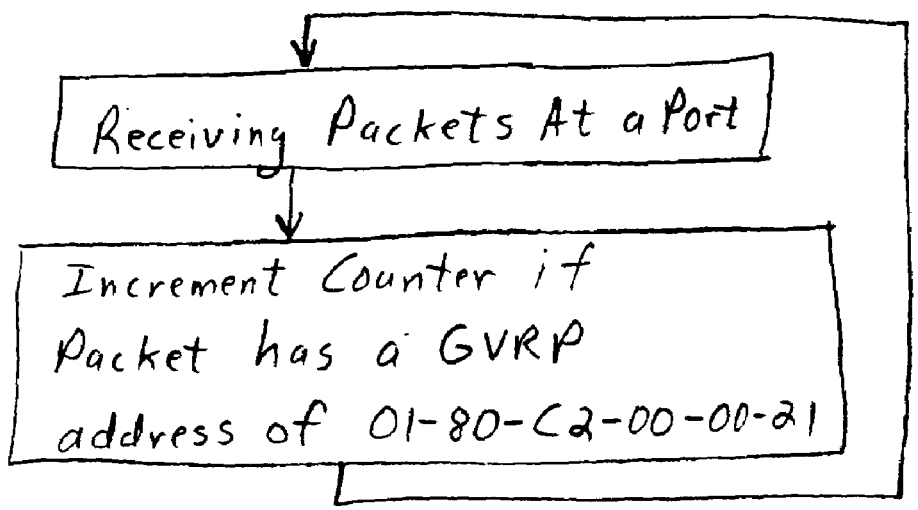
FIGS. 3-6 illustrate methods implementing embodiments of the present invention.
Figure 4:
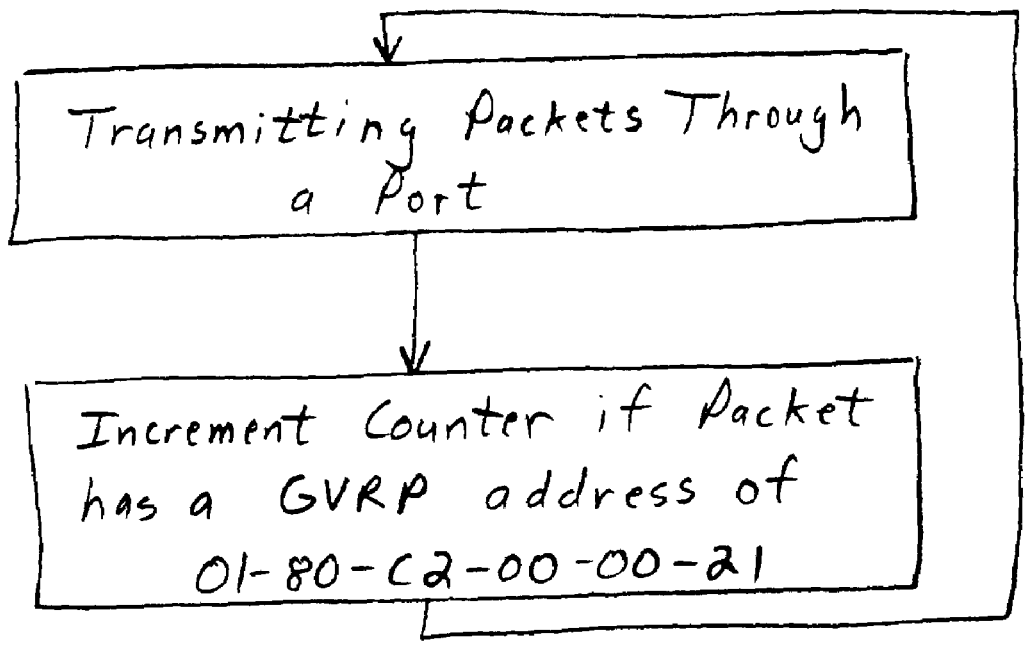

A first way in which these counters are useful is in determining whether devices are propagating GVRP PDUs (Protocol Data Units). The counters which relate to this are:

1. Rcv (received) GVRP PDUs—This counter represents the number of GVRP PDUs received and processed by a particular port. This counter is useful in diagnosing problems in which GVRP registration was expected on a port, but is not occurring. FIG. 3 illustrates a process implemented by such a counter.
2. Xmit (transmit) GVRP PDUs—This counter represents the number of GVRP PDUs transmitted by a particular port. This counter is useful for determining if a device is failing to propagate GVRP PDUs from a particular port. FIG. 4 illustrates a process implemented by such a counter.

A second way in which these counters are useful is in giving a network administrator both historical and current information regarding the number and type of IEEE 802.1Q VLANs configured on a device. An attempt to give such information is made in the VLAN MIB (proposed standard RFC 2674). Among others, the VLAN MIB defines the following counters:

1. dot1qMaxSupportedVlans—The maximum number of IEEE 802.1Q VLANs that this device supports.
2. dot1qNumVlans—The current 802.1Q VLANs that this device supports.

Figure 5:
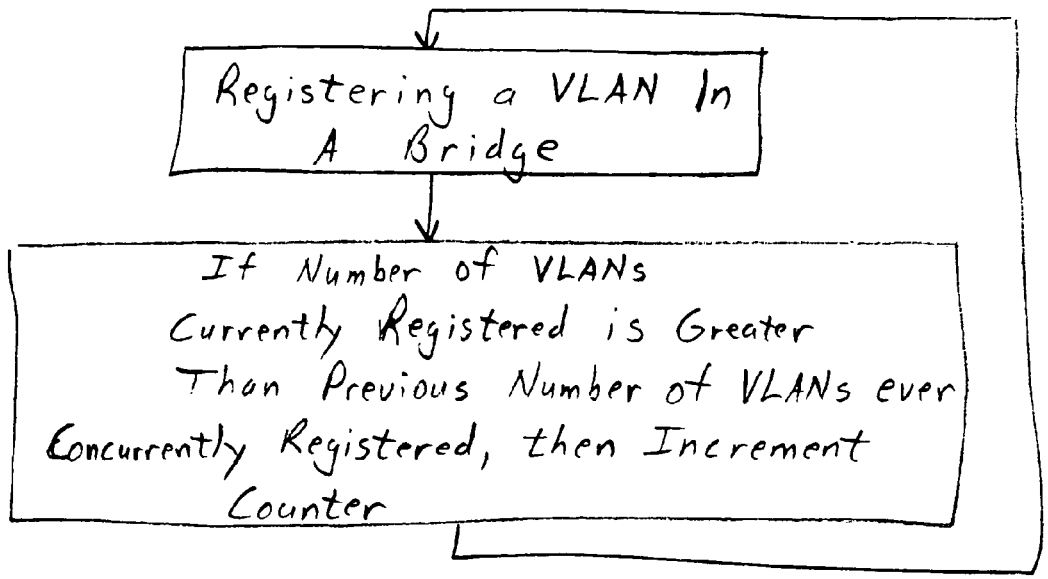
Figure 6:
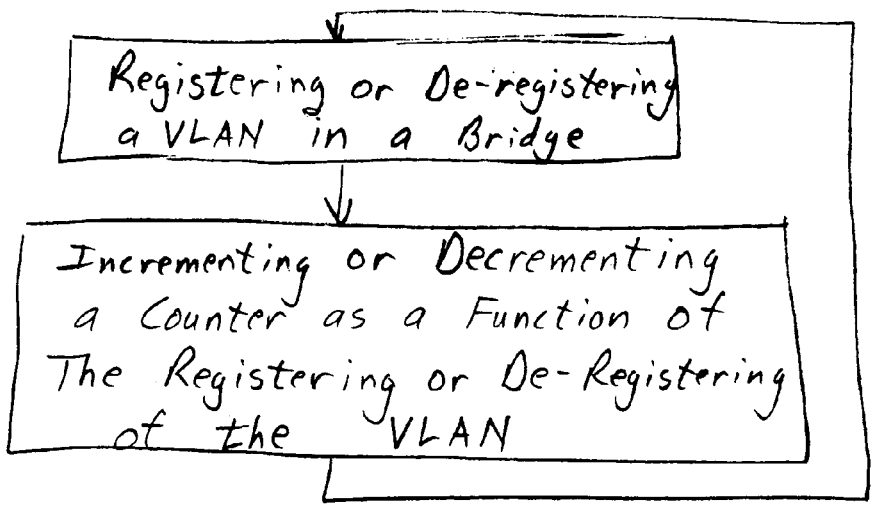

However, the counters defined in the VLAN MIB are insufficient to give a network administrator knowledge of either the greatest number of VLANs ever simultaneously configured on the device, or the nature of the VLANs configured on the device. For this reason, the present invention implements two counters:

1. A Most VLANs counter counts the greatest number of VLANs ever simultaneously configured on a device, including both static and dynamic VLAN entries. The counter is useful from a historical perspective. For example, suppose a network administrator expects to have only 8 VLANs ever present in a network. If a device has recorded that 9 or more VLANs have ever been concurrently configured in its tables, the network administrator is alerted to a potential security breach. This information is of particular importance when dynamic VLAN registration is allowed. FIG. 5 illustrates a process implemented by such a counter.
2. A Dynamic VLAN Entries counter counts the current number of dynamic VLANs registered with the device. FIG. 6 illustrates a process implemented by such a counter. This counter can be used in conjunction with the dot1qNumVlans counter to determine the number of static VLANs present on a device. The calculation is as follows:

Number of Static VLANs=dot1$q$NumVlans−Dynamic VLAN Entries.

Although the present invention and its advantages have been described in detail, it should be understood that various changes, substitutions and alterations can be made herein without departing from the spirit and scope of the invention as defined by the appended claims.

What is claimed is:

1. A bridge coupled to one or more LANs (Local-Area Networks) comprising:

a GVRP (GARP (Generic Attribute Registration Protocol) VLAN (Virtual Local-Area Network) Registration Protocol) participant operable for registering dynamic VLANs (Virtual Local-Area Networks);

a first counter operable for indicating a current number of dynamic VLANs registered at any one time;

a second counter operable for indicating a current total number of VLANs supported by the bridge at the any one time; and circuitry operable for determining a number of static VLANs supported in the bridge at the any one time by subtracting a value of the first counter from a value of the second counter.

2. A method implemented in a bridge coupled to one or more LANs (Local-Area Networks) comprising the steps of:

registering dynamic VLANs (Virtual Local-Area Networks) in the bridge;

incrementing a first counter for indicating a current number of dynamic VLANs registered at a specified time period;

incrementing a second counter for indicating a current total number of VLANs supported by the bridge at the specified time; and determining a number of static VLANs supported in the bridge at the specified time by subtracting a value of the first counter from a value of the second counter.

3. The method as recited in claim 2, further comprising the steps of:

de-registering dynamic VLANs in the bridge; and decrementing the first counter for indicating the current number of dynamic VLANs registered at a specified time period.

4. A bridge adaptable for coupling to one or more LANs (Local-Area Networks), comprising:

a first port operable for coupling to a first LAN; and circuitry operable for counting a number of only GVRP (GARP (Generic Attribute Registration Protocol) VLAN (Virtual Local-Area Network) Registration Protocol) PDUs (Protocol Data Units) propagated through the first port, wherein the counting circuitry counts how many GVRP PDUs have propagated through the first port to the exclusion of other types of data packets or data messages.

5. The bridge as recited in claim 4, wherein the counting circuitry further comprises: a first counter operable for counting a number of GVRP PDUs received through the first port.

6. The bridge as recited in claim 5, wherein the first counter increments when a received PDU has a specified MAC address.

7. The bridge as recited in claim 4, wherein the counting circuitry further comprises: a first counter operable for counting a number of GVRP PDUs transmitted by the first port.

8. The bridge as recited in claim 5, wherein the counting circuitry further comprises: a second counter operable for counting a number of GVRP PDUs transmitted by the first port.

9. The bridge as recited in claim 8, wherein the first and second counters increment when a received PDU has a specified MAC address.

10. A method for tracking dynamic registration of VLANs (Virtual Local-Area Networks) in a bridge operable for coupling to one or more LANs (Local-Area Networks), comprising the steps of:

propagating a plurality of frame packets containing GVRP (GARP (Generic Attribute Registration Protocol) VLAN (Virtual Local-Area Network) Registration Protocol) PDUs (Protocol Data Units) (GARP (Generic Attribute Registration Protocol) VLAN (Virtual Local-Area Network) Registration Protocol) PDUs (Protocol Data Units) through a first port coupled to a first LAN; and counting a number of only the GVRP PDUs propagated through the first port, wherein the counting step counts how many GVRP PDUs have propagated through the first port to the exclusion of other types of data packets or data messages.

11. The method as recited in claim 10, wherein the counting step further comprises the step of: counting a number of GVRP PDUs received through the first port.

12. The method as recited in claim 11, wherein the step of counting increments a first counter when a received PDU has a specified MAC address.

13. The method as recited in claim 10, wherein the counting step further comprises the step of: counting a number of GVRP PDUs transmitted by the first port.

14. The method as recited in claim 11, wherein the counting step further comprises the step of: counting a number of GVRP PDUs transmitted by the first port.

\* \* \* \* \*